United States Patent [19]
Thowe

[11] Patent Number: 6,115,788
[45] Date of Patent: Sep. 5, 2000

[54] MULTI-DRIVE ARRAY WITH IMPROVED DATA TRANSFER RATE PERFORMANCE

[75] Inventor: Merle Eugene Thowe, Yukon, Okla.

[73] Assignee: Seagate Technology, Inc., Scotts Valley, Calif.

[21] Appl. No.: 09/079,349

[22] Filed: May 15, 1998

Related U.S. Application Data

[60] Provisional application No. 60/075,470, Feb. 20, 1998.

[51] Int. Cl.[7] .................................................. G06F 11/00
[52] U.S. Cl. ........................... 711/114; 711/111; 711/112; 711/165; 714/6; 714/7
[58] Field of Search ..................................... 711/100, 111, 711/112, 113, 114, 115, 165; 714/7, 6

[56] References Cited

U.S. PATENT DOCUMENTS

| | | |
|---|---|---|
| Re. 34,100 | 10/1992 | Hartness . |
| 4,799,112 | 1/1989 | Bremmer et al. . |
| 5,262,907 | 11/1993 | Duffy et al. . |
| 5,574,851 | 11/1996 | Rathunde .................... 714/7 |
| 5,617,425 | 4/1997 | Anderson . |
| 5,696,933 | 12/1997 | Itoh et al. ................. 711/114 |
| 5,724,539 | 3/1998 | Riggle et al. ............. 711/100 |
| 5,724,552 | 3/1998 | Taoda ...................... 711/165 |
| 5,857,112 | 1/1999 | Hashemi et al. ............ 395/828 |
| 5,958,078 | 9/1999 | Yamamoto et al. ............ 714/766 |

OTHER PUBLICATIONS

Patterson et al., "A Case for Redundant Arrays of Inexpensive Disks(RAID)"; Report No. UCB/CSD 87/391—Computer Science Division (EECS), University of California, Dec. 1987.

*Primary Examiner*—Do Hyun Yoo
*Assistant Examiner*—Than Nguyen
*Attorney, Agent, or Firm*—Crowe & Dunlevy

[57] ABSTRACT

A method and apparatus are disclosed for improving data transfer rate performance in a multi-drive array configured as a redundant array of inexpensive discs (RAID). The array comprises at least first and second disc drives each comprising a rotatable disc on which a plurality of tracks are defined. An array controller is operably coupled to the disc drives to stripe data across the first and second disc drives using a common bus architecture. Logical block addresses (LBAs) are assigned to each of a plurality of data blocks of the tracks of the drives and are grouped into a number of zones, each zone having nominally the same number of LBAs. Data are thereafter transferred to and from the drives on a zone-basis, so that a block of data of determined size is divided between the first and second disc drives at a selected ratio so that a greater percentage of the block of data is written to the first zone as compared to the second zone.

17 Claims, 5 Drawing Sheets

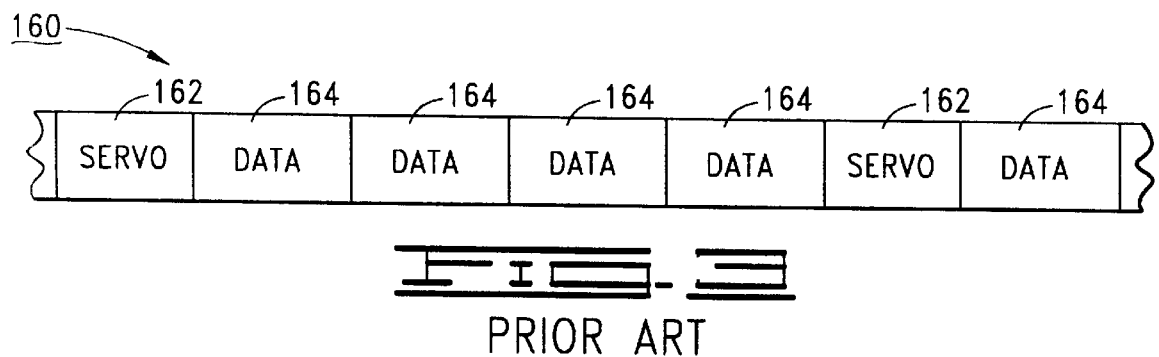
FIG. 3
PRIOR ART
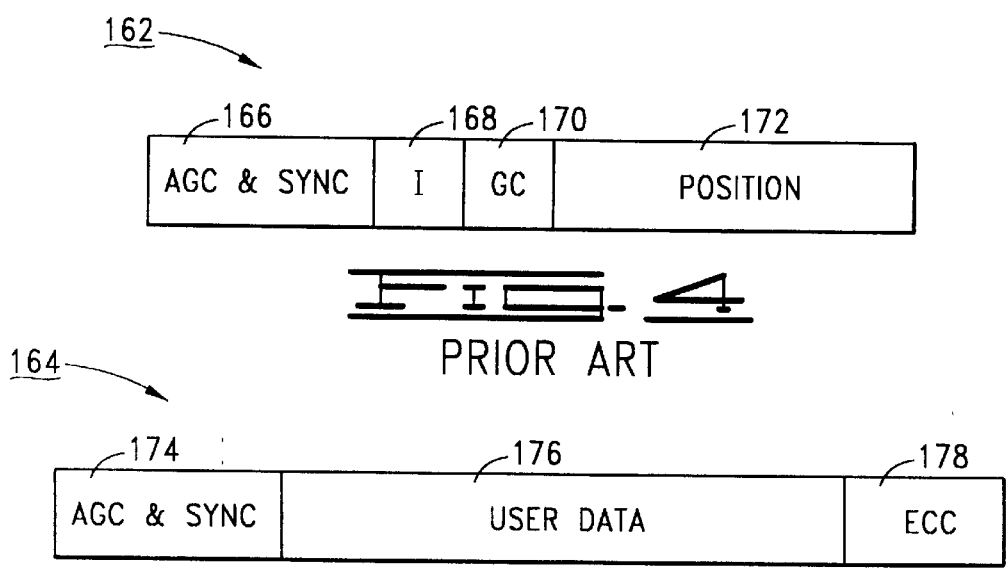
FIG. 4
PRIOR ART
FIG. 5
PRIOR ART
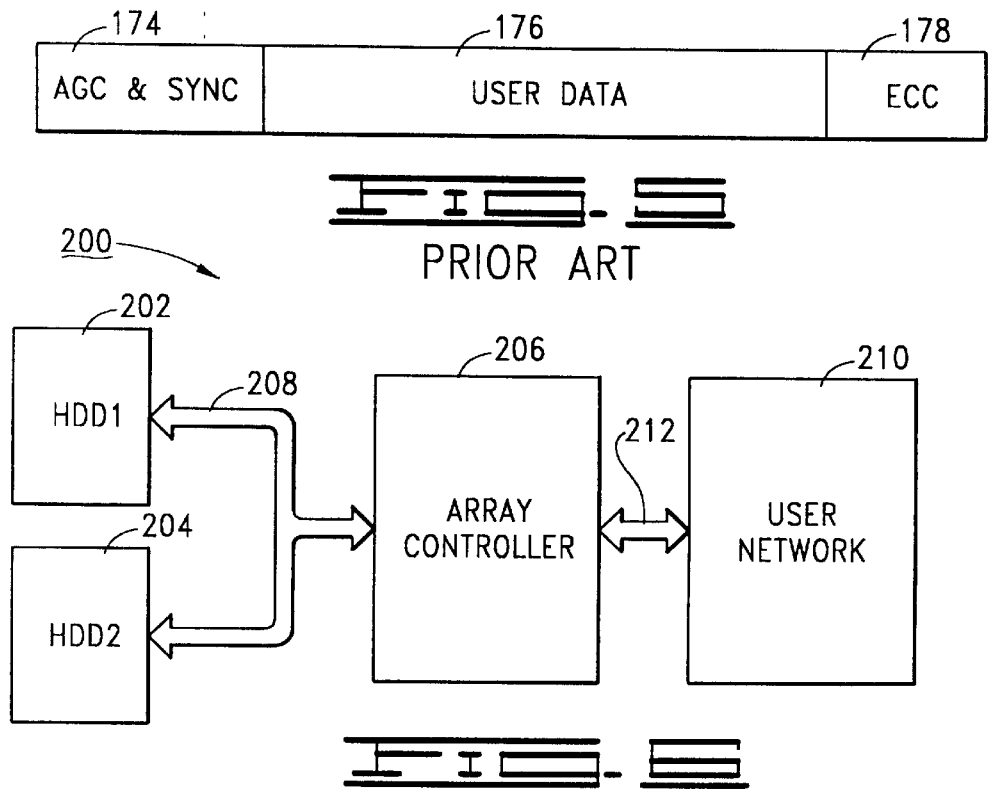
FIG. 6

MULTI-DRIVE ARRAY WITH IMPROVED DATA TRANSFER RATE PERFORMANCE

RELATED APPLICATIONS

This application claims priority to Provisional Application No. 60/075,470 entitled ZONED RAID 0, filed Feb. 20, 1998.

FIELD OF THE INVENTION

This invention relates generally to the field of disc drive storage devices, and more particularly, but not by way of limitation, to improving data transfer rate performance in a plurality of disc drives arranged in a multi-drive array.

BACKGROUND OF THE INVENTION

Disc drives are digital data storage devices which enable users of computer systems to store and retrieve large amounts of data in a fast and efficient manner. Disc drives of the present generation have data storage capacities in excess of several gigabytes (GB) and can transfer data at sustained rates of several megabytes (MB) per second.

A typical disc drive is provided with a plurality of magnetic recording discs which are mounted to a rotatable hub of a spindle motor for rotation at a constant, high speed. An array of read/write heads are disposed adjacent surfaces of the discs to transfer data between the discs and a host computer. The heads are radially positioned over the discs by a rotary actuator and a closed loop, digital servo system, and are caused to fly proximate the surfaces of the discs upon air bearings established by air currents set up by the high speed rotation of the discs.

A plurality of nominally concentric tracks are defined on each disc surface, with disc drives of the present generation having track densities in excess of 4,000 tracks per centimeter (10,000 tracks per inch). A preamp and driver circuit generates write currents that are used by the head to selectively magnetize the tracks during a data write operation and amplifies read signals detected by the head during a data read operation. A read/write channel and interface circuit are operably connected to the preamp and driver circuit to transfer the data between the discs and the host computer.

Disc drives are typically used in a stand-alone fashion, such as in a typical personal computer (PC) configuration where a single disc drive is utilized as the primary data storage peripheral. However, in applications requiring vast amounts of data storage capacity or high input/output (I/O) bandwidth, a plurality of drives can be arranged into a multi-drive array, sometimes referred to as a RAID ("Redundant Array of Inexpensive Discs"; also "Redundant Array of Independent Discs").

The primary impetus behind the development of such multi-drive arrays is the disparity between central processing unit (CPU) speeds (which continue to increase at a phenomenal rate bounded primarily by electronic constraints), and disc drive I/O speeds (which are bounded largely by mechanical constraints). As will be recognized, an array of smaller, inexpensive drives functioning as a single storage device will usually provide improved operational performance over a single, expensive drive. A seminal article proposing various RAID architectures was published in 1987 by Patterson et al., entitled "A Case for Redundant Arrays of Inexpensive Discs (RAID)", Report No. UCB/CSD 87/391, December 1987, Computer Science Division (EECS), University of California, Berkeley, Calif.

RAID architectures are presently identified by numerical levels of organization, with each level providing different data integrity and I/O throughput characteristics. The particular level (or levels) used in a given application largely depend upon the requirements of the application. Although commonly utilized RAID levels range from RAID 0 to RAID 7, as well as combinations thereof, to facilitate the present discussion the more popular RAID levels will be briefly discussed as follows.

RAID 0 is an architecture wherein data are divided among a plurality of drives operably connected to a single controller by way of a common I/O bus, such as SCSI (Small Computer Synchronous Interface), SCSI-2, SCSI-3, or Fibre Channel. For example, in a two-drive RAID 0, half of the data are stored on one drive and the other half are stored on the remaining drive. This is usually accomplished on a data block (sector) basis, so that each drive receives every other block of data. Data transfer performance during a read operation is thus essentially doubled over that of a single drive. Data integrity levels, however, remain essentially the same as those offered by each drive individually, in that error correction codes (ECC) are utilized for the data stored by each drive, but no inter-drive error detection and correction takes place. The storing of data across multiple drives is often referred to as "striping."

RAID 1 entails the operation of multiple (usually two) drives in parallel so that the same data are simultaneously written to all of the drives. This technique is often referred to as "mirroring." RAID 1 is commonly employed in applications where increased reliability is desired (such as a local area network, or LAN). Read performance is typically improved slightly over that of a single drive, in that data are usually recovered from the drive having the head that is closer to the location on the disc where the data are stored (some controllers can provide parallel access, significantly improving recovery time). Write performance is typically degraded slightly, however, as each write operation requires the simultaneous writing of one or more duplicate set(s) of data. Finally, the cost of data storage (per MB) is increased by a factor equal to the number of drives (e.g., in a two-drive RAID 1, the cost per MB is doubled as compared to a single drive).

RAID 3 is a multi-drive architecture in which parity (error correction) is introduced across the drives. That is, the data are interleaved at a bit level across several drives, and one drive is designated as a parity drive on which parity information is stored. Hence, the system is fault-tolerant in that all of the data can be reconstructed in the event of a loss of a single drive from the array. Because all of the drives are accessed during a given I/O operation, the slowest drive largely determines the transfer rate performance of the system as a whole. RAID 3 also facilitates "hot-swapping", allowing individual drives to be removed from the system during operation (such as in the event of a failed drive).

RAID 5 also uses parity across the drives, but implements such on a data block (sector) basis. This eliminates the need for a designated parity drive (as with RAID 3) and the associated data transfer "bottle-necks" that can arise therefrom, as updating a parity drive can take a significant amount of time. RAID 5 does require additional levels of overhead to track the location of the parity addresses. Improvements in I/O performance can be obtained when transfers are relatively small and random, but this performance degrades with larger, sustained transfers. It will be noted that RAID 1 through 5 were originally proposed in the aforementioned Patterson et al. article.

RAID 7 is one of the more recently proposed levels in the RAID taxonomy, allowing each individual drive to access data as quickly as possible through the use of a central cache (in the controller) and a process-oriented operating system embedded in the array. This embedded operating system allows each drive to move its heads independently of the other drives, unlike previous RAID levels wherein the heads are moved synchronously. Also, RAID 7 allows the use of different types of drives in the array, unlike previous RAID levels. Finally, dynamic mapping is employed so that updated data do not have to be written in the same physical location as the original data, which can enhance transfer performance of the array.

Besides these various RAID architectures, combinations thereof are also commonly utilized, such as RAID 0+1 ("zero plus one"), which uses both RAID 0 (data splitting) and RAID 1 (drive mirroring). Thus, a RAID 0+1 requires at least four drives to implement.

As provided above, a RAID is typically utilized to enhance the reliability of a data storage system and/or to improve the data transfer characteristics of the system. To attain high, sustained data transfer rates, a RAID 0 is one of the more suitable choices, in that the transfer of data is performed in parallel among the various drives composing the array. It will be noted that a RAID 0+1 also provides a high data transfer rate, as well as increased reliability due to mirroring (but requires twice as many drives as a RAID 0). Examples of systems that typically require high, sustained data transfer rates include real-time audio-video (AV) and satellite data communications applications.

To increase data recording densities, disc drives typically employ zone based recording (ZBR) such as disclosed in U.S. Pat. No. 4,799,112 issued Jan. 17, 1989 to Bremmer et al., assigned to the assignee of the present invention. As will be recognized by those skilled in the art, ZBR generally entails defining a plurality of essentially constant bit-density zones across the radii of the discs, so that all of the tracks in each zone have the same number of data blocks (sectors) in which user data are stored. Thus, the number of data blocks per track will increase in a step-wise fashion from the inner diameter (ID) to the outer diameter (OD) of the discs.

The use of ZBR results in a disc drive transfer rate that varies with radius, with the transfer rate about doubling for tracks at the OD as compared to tracks at the ID. Hence, to maintain an acceptably high sustained data transfer rate, it is sometimes necessary to only utilize tracks beyond a certain radius on the discs, as tracks within this radius (toward the ID) will not reliably support the required transfer rate. In such a case, less than all of the available data capacities of the drives can be utilized, limiting the capabilities of the RAID.

Accordingly, there is a continual need in the art for improvements whereby the sustained data transfer rate of a RAID can be enhanced.

SUMMARY OF THE INVENTION

The present invention provides an apparatus and method for improving data transfer rate performance in a multi-drive array.

As exemplified in a preferred embodiment, the array comprises at least first and second disc drives, each comprising a rotatable disc on which a plurality of tracks are defined. A RAID 0 array controller is operably coupled to the disc drives to stripe data across the first and second disc drives using a common bus architecture.

Logical block addresses (LBAs) are assigned to each of a plurality of data blocks of the tracks of the drives. The tracks of each drive are further grouped into a number of zones, each zone having nominally the same number of LBAs.

Data are thereafter transferred to and from the drives in relation to the physical locations of the accessed LBAs, so that a greater percentage of the data are written to and read from tracks that are physically located nearer the OD of the discs as compared to tracks that are physically located nearer the ID of the discs.

In this way, the array obtains significantly increased minimum data transfer rates, by as much as 50% or more compared to a conventional RAID, through the adjustment of data distribution ratios in relation to track radius. Increases in data capacity and data quality can also be obtained. Although a RAID 0 is provided in a preferred embodiment, other RAID levels can alternatively be employed, such as RAID 0+1, RAID 3, etc.

These and various other features as well as advantages which characterize the present invention will be apparent from a reading of the following detailed description and a review of the associated drawings.

BRIEF DESCRIPTION OF THE DRAWINGS

FIG. 4 shows a representation of a selected data block from FIG. 3.

FIG. 5 is a representation of a selected servo block from FIG. 3.

FIG. 6 a functional block diagram of a storage system having a Redundant Array of Inexpensive Discs (RAID) comprising a pair of disc drives HDD1 and HDD2 nominally identical to the disc drive of FIG. 1, in conjunction with a RAID controller and a user network.

FIG. 9 provides a flow chart for a ZONED RAID DATA I/O routine, performed during a data input/output (I/O) operation of the RAID of FIG. 6 in accordance with a preferred embodiment of the present invention, the routine indicative of programming utilized by the RAID controller of FIG. 6.

DETAILED DESCRIPTION

Figure 1:
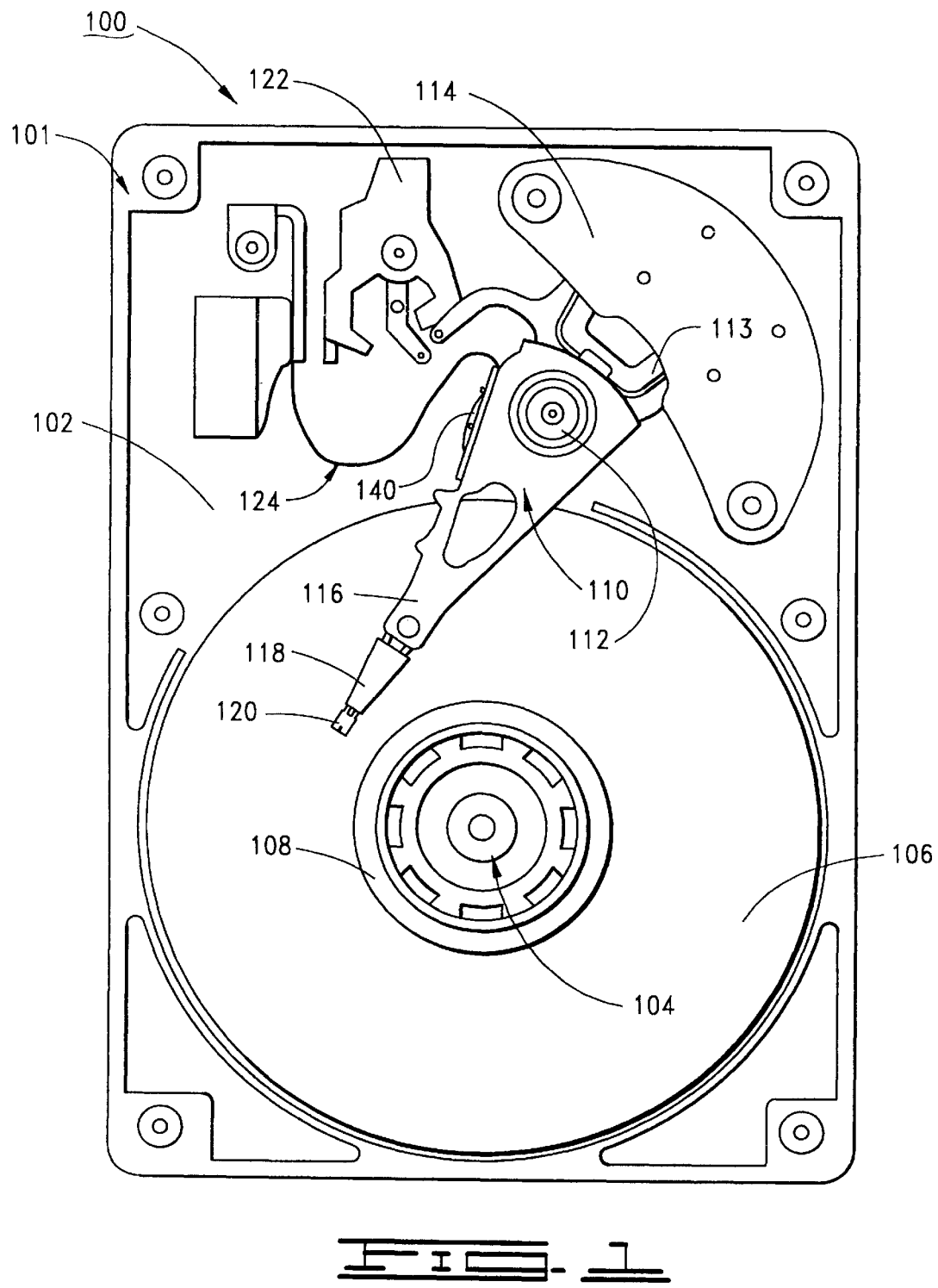
FIG. 1 shows a top plan view of a disc drive constructed in accordance with a preferred embodiment of the present invention.

Referring now to the drawings, FIG. 1 shows a top plan view of a disc drive 100 constructed in accordance with a preferred embodiment of the present invention. The disc drive 100 includes a head-disc assembly (HDA) 101 and a printed wiring assembly (PWA) which is mounted to the underside of the HDA, and thus not visible in FIG. 1.

A top cover, omitted from FIG. 1 to reveal interior portions of the HDA 101, mates with a base deck 102 of the HDA 101 in order to provide an environmentally controlled housing for the HDA 101. A spindle motor (generally designated at 104) is supported by the base deck 102 and rotates a plurality of discs 106 at a constant high speed. A disc clamp 108 secures the discs 106 to the spindle motor 104.

The discs 106 include recording surfaces (not separately identified) to which user data are written by way of a rotary actuator assembly 110, which rotates about a cartridge bearing assembly 112 in response to the application of current to a coil (113, a portion of which is visible in FIG. 1) of a voice coil motor (VCM) 114. A plurality of rigid arms 116 extend from the actuator assembly 110, each of which supports a corresponding flexible suspension assembly 118. A plurality of heads 120 are supported by the suspension assemblies 118 over the recording surfaces of the discs 106 by an air bearing established by air currents set up by the high speed rotation of the discs 106. The heads 120 are preferably characterized as magneto-resistive (MR) heads.

A latch assembly 121 secures the actuator assembly 110 when the disc drive 100 is deactivated and a flex circuit assembly 124 allows communication between the actuator assembly 110 and the disc drive PWA, both in a conventional manner.

Figure 2:
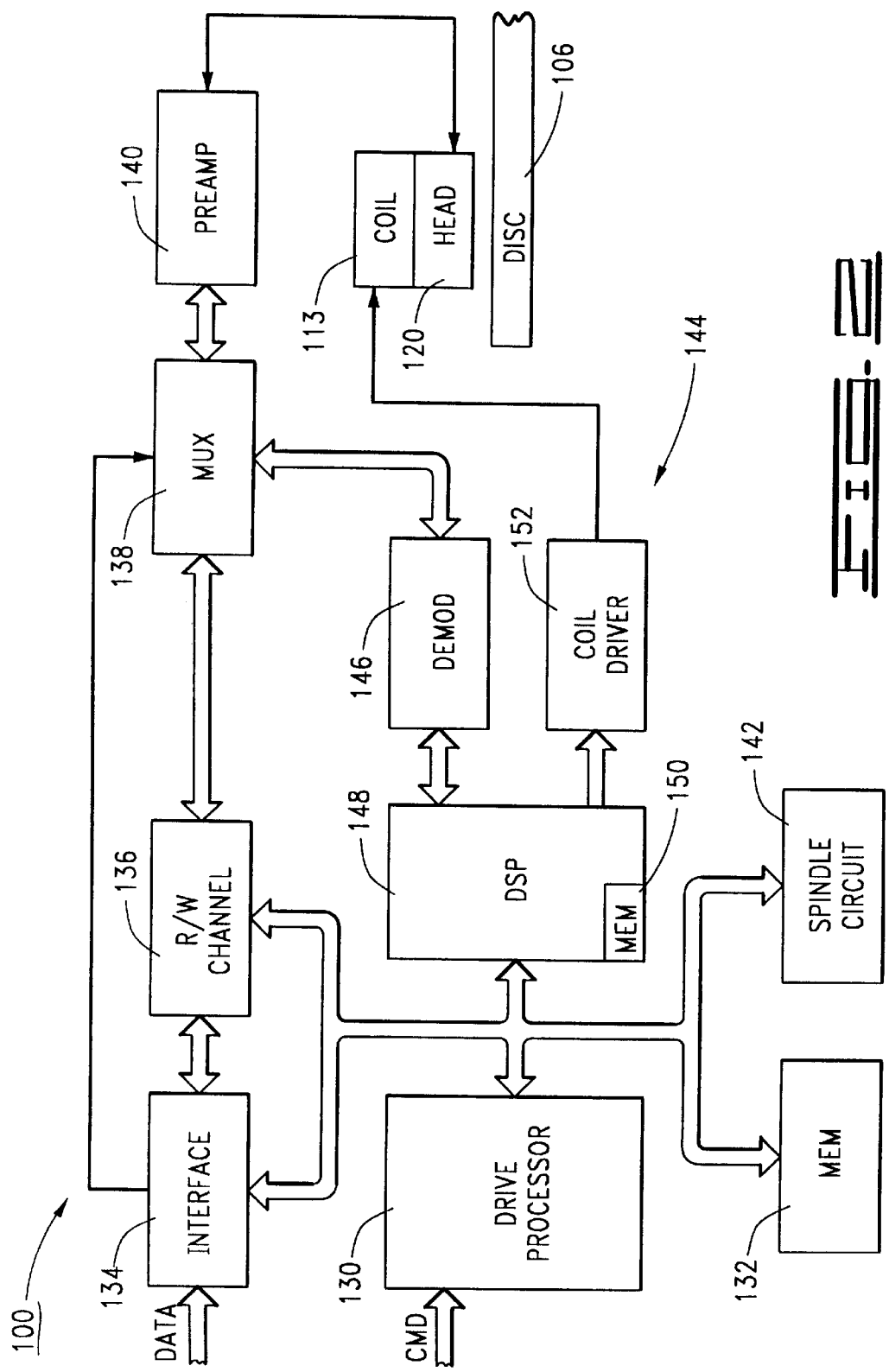
FIG. 2 provides a functional block diagram of the disc drive of FIG. 1.

Referring now to FIG. 2, shown therein is a generalized functional block diagram of the disc drive 100 of FIG. 1, setting forth the operational interconnection of various circuits and components of interest.

Initially, FIG. 2 shows a drive processor 130 which provides top level control of the operation of the disc drive 100. Programming and parameter values utilized by the drive processor 130 are stored in drive processor memory 132 (MEM), which preferably comprises both volatile and non-volatile memory devices such as dynamic random access memory (DRAM) and flash memory. An interface circuit 134 includes a data buffer (not shown) for the temporary buffering of transferred data, and a sequencer (also not shown) which directs the operation of the disc drive 100 during data transfer operations.

During a data write operation, the interface circuit 134 buffers and passes input data to a read/write channel 136, which encodes the data with run-length limited (RLL) and error correction codes (ECC). The encoded data are passed through a selectable multiplexor (mux) 138 to a preamp driver circuit 140 (preamp), with the mux 138 controlled by the sequencer. The preamp 140 applies write currents to the selected head 120 in order to selectively magnetize the corresponding disc 106. The preamp 140 is preferably disposed within the confines of the HDA 101 as shown in FIG. 1.

During a data read operation wherein previously stored data are retrieved from the disc 106, the preamp 140 applies a read bias current to the head 120 and monitors the voltage across a magneto-resistive (MR) element of the head 120, the voltage varying with respect to the selective magnetization of the disc 106. The detected voltage is preamplified by the preamp 140 to provide an amplified read signal to the read/write channel 136, which decodes the stored data and provides the same to the buffer of the interface circuit 134 for subsequent transfer to a host computer (not shown).

A spindle circuit 142 is provided to rotate the spindle motor 104 using back electromotive force (bemf) commutation. For reference, the discs 106 are nominally rotated at 7,200 revolutions per minute during operation.

A servo circuit (denoted generally at 144) controls the position of each of the heads 120 with respect to the corresponding discs 106 in response to servo information read from the discs 106 and passed to the servo circuit 144 by way of the preamp 140 and the mux 138. The servo circuit 144 includes a demodulator (demod) 146 which conditions the servo information for use by a digital signal processor (DSP) 148 having associated programming in memory (MEM) 150. The DSP 148 provides a current command signal to a coil driver 152, which outputs current to the coil 113 in order to position the heads 120 relative to the discs 106.

The servo circuit 144 operates in two primary, selectable modes: seeking and track following. During a seek, a selected head 120 is moved from an initial track to a destination track through the initial acceleration and subsequent deceleration of the head 120 toward the destination track. Once the head 120 has been settled onto the destination track, the servo circuit 144 operates in the track following mode, using the servo information to maintain the head over the destination track. Such servo operation is discussed in greater detail in U.S. Pat. No. 5,262,907 issued Nov. 16, 1993 to Duffy et al., assigned to the assignee of the present invention.

Figure 3:
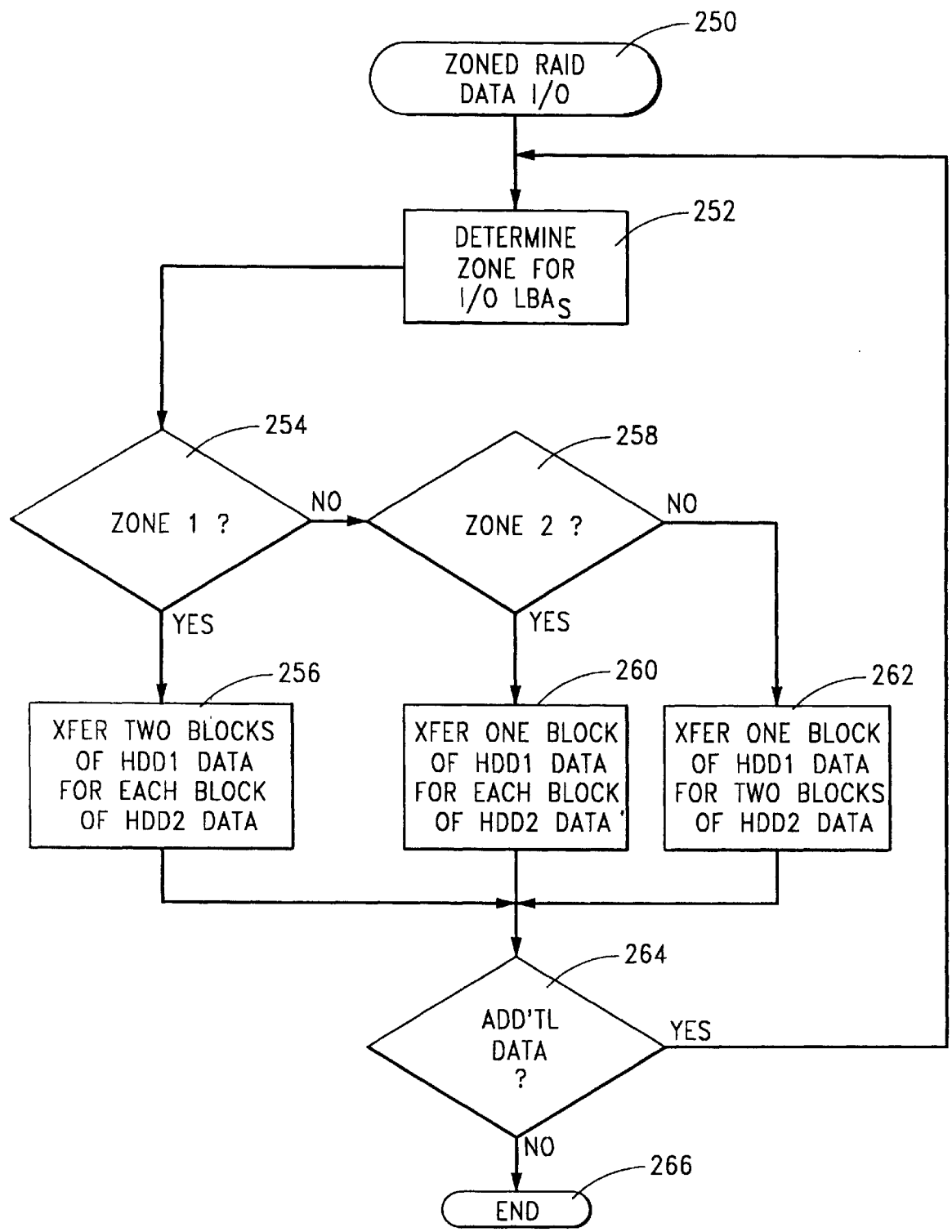
FIG. 3 is a representation of a portion of a track of the disc drive.

Referring now briefly to FIGS. 3–5, shown therein are representations of the manner in which information is stored on the discs 106 (for clarity, the various blocks shown in FIGS. 3–5 are not necessarily drawn to scale). FIG. 3 shows a portion of a track 160, on which servo blocks 162 and data blocks 164 (sectors) are disposed. The servo blocks 162, which store servo information used by the servo circuit 144, are written during disc drive manufacturing and are arranged on the discs 106 in a plurality of radially extending wedges, like spokes on a wheel. The data blocks 164 are subsequently defined between adjacent servo blocks 162 during a disc drive formatting operation. For reference, a typical data block size is 512 bytes, so that a disc drive having a data storage capacity of about 18 gigabytes (GB) will have about 35 million such data blocks 164 distributed among the various disc surfaces of the drive.

As will be recognized, each data block 164 is identified as a unique logical block address (LBA) so that data transfer operations are performed on an LBA basis; that is, a table is provided in memory 132 (FIG. 2) indicative of the physical location (track number and radial position) of each LBA. In this way, a host controller (not shown) can identify a particular LBA or group of LBAs to be accessed and the disc drive 100 can use the table to instruct the servo circuit 144 to properly position the associated head 120 over the corresponding disc 106 to effect the transfer. Thus, in accordance with common industry practices the data blocks 164 will hereinafter also be referred to as LBAs.

It is contemplated that the disc drive 100 employs zone based recording (ZBR) techniques such as described in the aforementioned Bremmer et al. U.S. Pat. No. 4,799,112 reference, so that tracks at outer diameters (ODs) of the discs 106 will have a greater number of LBAs than tracks at inner diameters (IDs) of the discs 106. Further, although the format of FIG. 3 sets forth an embedded servo scheme, such is not limiting to the present invention as claimed below.

FIG. 4 shows the generalized format of each servo block 162 of FIG. 3. As typical in the art, the servo block 162 includes an automatic gain control and synchronization (AGC & Sync) field 166 which facilitates servo circuit amplitude and timing adjustment, an index field 168 which indicates angular position on the disc 106, a Gray code (GC) field 170 indicative of radial position (physical track address) and a position field 172 providing intra-track positional control information (such as a quadrature dibit burst pattern as discussed in the aforementioned Duffy U.S. Patent No. 5,262,907).

FIG. 5 shows the generalized format for each data block (LBA) 164 of FIG. 3 to include an AGC & Sync field 174, a user data field 166 in which the encoded data are stored, and an error correction code (ECC) field 168 in which error correction code words, appended to each block of data, are stored. The code words enable the read/write channel 132 (FIG. 2) to detect and correct up to a selected number of erroneous bytes (symbols) in the data read back from the user data field 176.

Having concluded the foregoing discussion of the construction and operation of the disc drive 100 of FIGS. 1–5, reference is now made to FIG. 6, which shows a simplified, functional block diagram of a storage system 200, constructed in accordance with a preferred embodiment of the present invention. The storage system includes a Redundant Array of Inexpensive Discs (RAID) comprising a pair of hard disc drives (HDD) 202, 204 which, except as noted below, are nominally identical to the disc drive 100 of FIG. 1. The disc drives of FIG. 6 are individually identified as HDD1 and HDD2, respectively.

The disc drives 202, 204 are operably coupled to an array controller 206 by way of a common bus 208 (preferably comprising a SCSI architecture). The array controller 206 operates to control the transfer of data to and from the HDD1 and HDD2 drives 202, 204 in a generally conventional manner, except for novel aspects which will be discussed in detail below. The array controller 206 in turn is operably coupled to a user network 210, which preferably comprises a number of networked computers which access the RAID by way of a network bus 212, although other types of configurations can be readily contemplated, such as a network server, mainframe computer system, etc.

Although additional components such as cabinets, power supplies and cooling equipment are typically employed in systems such as 200, such are germane to the present invention and have accordingly been omitted from FIG. 6 for purposes of clarity. Further, the disc drives 202, 204 are contemplated as being configured in a RAID 0 used primarily for sustained, high speed transfer of video images at a selected data transfer rate; a presently typical rate is about 18 megabytes per second (MB/sec). To facilitate the present discussion, the drives 202, 204 are contemplated as having individually sustainable maximum data transfer rates less than the selected data transfer rate, such as, for example, about 15 MB/sec.

As discussed above, a particularly important advantage of a typical RAID 0 is the fact that, because data are striped across the various drives in a parallel fashion (i.e., the data are divided among the various drives), the transfer rate of the RAID 0 is substantially increased over that achievable by any drive alone. Nevertheless, the maximum sustainable data transfer rate of a typical RAID 0 will generally depend upon the physical location of the data, in that higher rates will be obtained for data stored nearer the OD of the discs as compared to data stored nearer the ID of the discs.

Depending upon the individual maximum sustainable transfer rates of the drives in a RAID 0 and the rate at which the transfer rates of the drives decreases as data are stored closer to the IDs of the discs, it may be necessary to modify the configuration of the RAID 0 to achieve a specified sustained data transfer rate. In the prior art, such modifications having typically included only using a portion of the available disc space (i.e., only those tracks beyond a certain radius), compressing the data, and adding additional drives to the RAID 0 to meet the specified transfer rate.

The present invention, however, overcomes these and other limitations of the prior art, facilitating improvements in minimum sustainable RAID data transfer rates by as much as 50% or more. The manner in which a preferred embodiment operates to achieve such increases will now be discussed, with reference to FIGS. 7 and 8.

Figure 7:
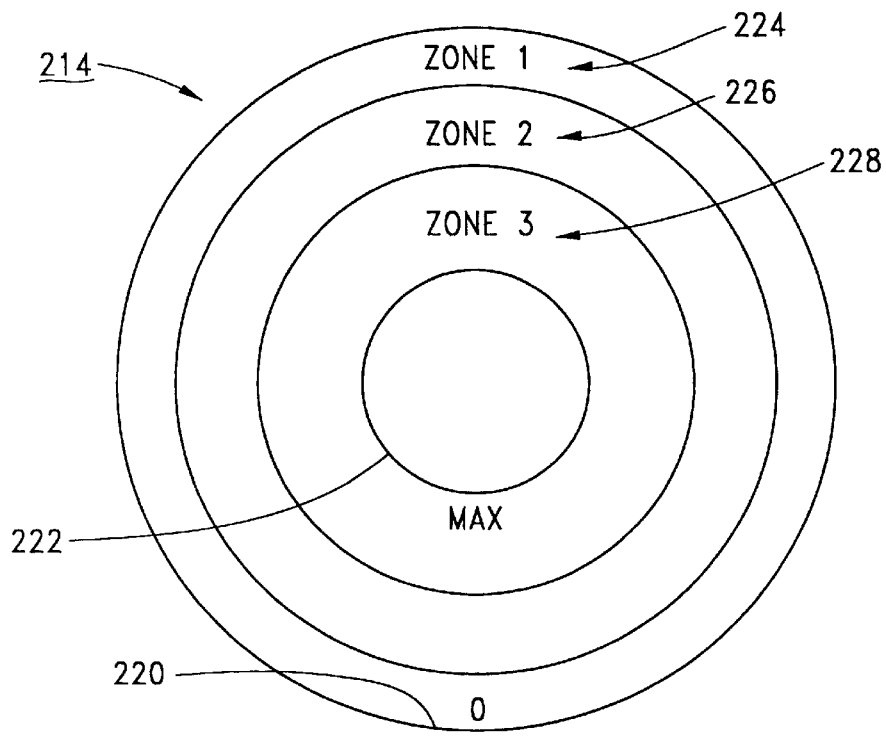
FIG. 7 is a top plan view of a selected disc from the HDD1 drive of FIG. 6, showing zones configured in accordance with a preferred embodiment of the present inventions.

FIG. 7 shows a selected disc (denoted at 214) of the HDD1 drive 202 of FIG. 6, with the disc 214 being substantially identical to the disc 106 of FIG. 1. Although not individually shown, tracks (such as 160 of FIG. 3) are concentrically defined on the surface of the disc. The tracks are numbered from OD to ID, with "track 0" 220 identified at the OD and a maximum track ("track max") 222 at the ID. As will be recognized, track 0 220 will contain substantially more LBAs than the track max 222.

The tracks are grouped into three zones 224, 226 and 228, identified as ZONE 1, ZONE 2 and ZONE 3, respectively. The zones 224, 226 and 228 preferably divide the disc 214 so that each zone contains one-third of the total number of LBAs on the disc surface. Hence, each zone covers nominally the same surface area on the disc 214. For clarity, it will be noted that this zoning of the disc 214 is in addition to, and independent of, the ZBR-based zoning discussed above (i.e., the zones 224, 226, 228 are not related to ZBR zones, each of which have the same number of LBAs per track). It will be farther noted that track 0 (220) is disposed in ZONE 1 (224) and track max (222) is disposed in ZONE 3 (228). Each of the remaining discs of the HDD1 drive 202 are similarly zoned as shown in FIG. 7.

Figure 8:
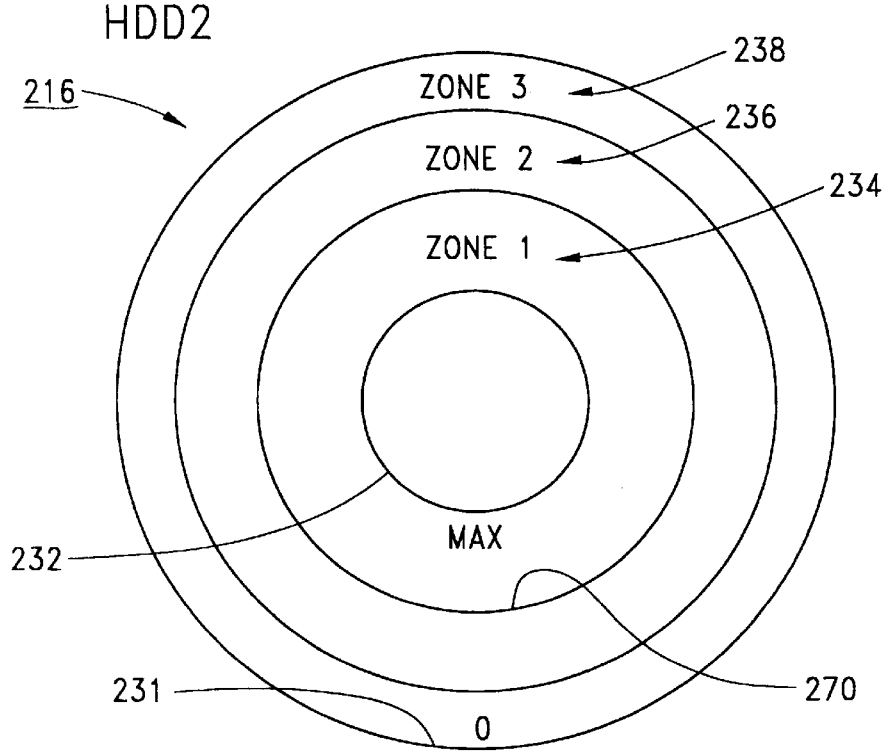
FIG. 8 is a top plan view of a selected disc from the HDD2 drive of FIG. 6, showing a reversed zone configuration as compared to that of FIG. 7.

Referring to FIG. 8, shown therein is a selected disc (denoted at 216) of the HDD2 drive 204 of FIG. 6, with the disc 216 being substantially identical to the disc 106 of FIG. 1. That is, the disc 216 is also provided with a plurality of tracks, with track 0 indicated at 230 at the OD of the disc 216 and track max is indicated at 232 at the ID.

The disc 216 of FIG. 8 also has three zones 234, 236, 238 identified as ZONE 1, ZONE 2 and ZONE 3, respectively, with each zone having nominally the same number of LBAs (and the same nominal surface area). However, FIG. 8 shows ZONE 1 (234) to be disposed near the ID of the disc 216 and ZONE 3 (238) to be disposed near the OD of the disc 216, so that the zone designations of FIG. 8 are reversed with respect to the designations of FIG. 7. In this manner, the range of LBAs of ZONE 1 (224) in HDD1 202 corresponds to the range of LBAs of ZONE 1 (234) of HDD2 204, even though these respective ranges of LBAs are disposed at different regions of the discs (i.e., near the OD in HDD1 and near the ID in HDD2). This is similarly true for the LBAs of ZONE 3 (228, 238). Each of the surfaces of the discs of the HDD2 drive 204 are similarly configured as set forth in FIG. 8.

The purpose for the reverse zone designations of the HDD2 drive 204 will become evident with a review of FIG. 9, which shows a ZONED RAID DATA I/O routine 250, illustrating steps performed during a data I/O (e.g., reading or writing) operation by the storage system 200 of FIG. 6 in accordance with a preferred embodiment. For reference, the steps shown in FIG. 9 are generally representative of programming used by the array controller 206 of FIG. 6.

Generally, the routine of FIG. 9 operates to write and read data to and from the HDD1 and HDD2 drives 202, 204 in relation to the radial location of the accessed tracks. That is, unlike prior art RAID 0 systems wherein the data are divided equally among the various drives in the array, the routine of FIG. 9 increases the minimum data transfer rates by transferring a larger portion of the data to and from LBAs on tracks physically disposed toward the OD of the discs as compared to LBAs on tracks disposed toward the ID. For clarity of illustration, the following discussion will assume that a data write operation is to be performed by the array controller 206, so that the various steps will be described in terms thereof.

Referring now to step 252 of FIG. 9, the routine first determines the zone (ZONE 1, 2 or 3) associated with the selected LBAs to which the data are to be written. As with conventional RAID 0 practices, the array controller 206 will treat the drives as a single logical drive and will transfer the data in fixed-sized packets, such as 4 kilobytes (kB), to a successive number of LBAs on both drives. However, unlike conventional RAID 0 practices where the data are divided evenly, as explained below, a selected ratio is used so that a greater percentage of the data are written to one drive as compared to the other drive.

The routine of FIG. 9 next passes to decision step 254, which inquires whether the selected LBAs fall within ZONE 1 (that is, within zones 224 of FIG. 7 and 234 of FIG. 8); if so, the routine passes to step 256, wherein two blocks of data are written to the HDD1 drive 202 for each block of data written to the HDD2 drive 204. The 2:1 ratio is selected on the basis that the drives 202, 204 have transfer rates at the ODs that are substantially twice the rates at the IDs.

However, when the selected LBAs to which the data are to be written are not disposed in ZONE 1, the flow passes from decision step 254 to decision step 258, which inquires whether the selected LBAs are disposed within ZONE 2 (226 in FIG. 7 and 236 in FIG. 8). If so, the flow passes to step 260, wherein the data are evenly split between the drives 202, 204 (that is, one block of data is written to HDD1 for each block of data written to HDD2). It will be apparent that the operation of step 260 is generally in accordance with existing RAID 0 practices which split data evenly between two (or more) drives.

However, when the selected LBAs fall within ZONE 3 (228 in FIG. 7 and 238 in FIG. 8), the routine passes from decision step 258 to step 262 wherein one block of data is written to the HDD1 drive 202 for every two blocks of data written to the HDD2 drive 204. Thus, step 262 is essentially the reverse of step 256, but the result is the same, in that twice as much data are written to the track near the OD as compared to the ID.

At the conclusion of each of the data transfer operations of steps 256, 260, 262, the routine next inquires at decision step 264 whether additional data access operations are to be performed (e.g., written, in the present example). If so, the routine returns to step 252 for another pass through the routine. When the write operation is completed, the routine ends at step 266. It will be readily understood that a data read operation follows basically the same process, in that more data are read from tracks near the OD as compared to the ID, on a zone-determined basis.

There are a variety of ways contemplated to implement the system 200 of FIGS. 6–9. One preferred approach to obtaining the reverse zoning of FIG. 8 would be to format the HDD2 drive 204 so that LBAs begin at the ID and work outwardly to the OD (the HDD1 drive 202 would retain the usual OD to ID LBA numbering). As LBAs are typically assigned on a cylinder basis (i.e., all of the corresponding tracks of the various disc surfaces at each radius), the LBA designations for HDD2 would begin at the innermost cylinder and work outwardly. In this way, the corresponding LBAs on the drives 202, 204 would be retained in the corresponding zones.

An alternative approach would be for the array controller 206 to forego a reformatting operation and instead keep track of the zones associated with each LBA of the HDD2 drive 204. As will be appreciated, the zone boundaries could be readily determined at ⅓ and ⅔ of the total number of LBAs. By way of illustration, a write operation involving selected LBAs on track 0 (220, FIG. 7) of HDD1 at the OD of the disc 214 would further involve corresponding LBAs at a track at the outermost boundary of ZONE 1 on HDD2 (indicated at 270 in FIG. 8). Thus, the array controller 206 would write two LBAs on the track 220 in FIG. 7 for each LBA written on the track 270 in FIG. 8.

Further, as a conventional RAID 0 array controller is designed to split and distribute the data evenly among the various drives in the array, it is contemplated that such a controller could be readily modified in accordance with the routine of FIG. 9 and the discussion herein to change the data distribution ratios for ZONES 1 and 3, leaving the array controller to nominally operate the same as before for transfers within ZONE 2.

Although the system 200 of FIG. 6 utilizes a RAID 0, it contemplated that such is not limiting. That is, the present invention (as claimed below) could be readily modified for use with other RAID levels, such as RAID 0+1, RAID 3, etc. The parity striping utilized in the higher RAID levels generally requires a greater amount of complexity in the associated array controllers, but the fundamental methodology as set forth by the routine of FIG. 9, i.e. enhancing data transfer rate performance by transferring more data to tracks nearer disc ODs, could still be readily implemented as desired. RAID 0 remains the preferred architecture, however, because of the enhanced data transfer capabilities realized through parallel data transfer.

Although three zones have been disclosed in a preferred embodiment (as set forth in FIGS. 7 and 8), it is contemplated that different numbers of zones could be employed, as desired, such as just two zones (with distribution ratios of 2:1 for ZONE 1 and 1:2 for ZONE 2). These and other various modifications are contemplated as being within the spirit and scope of the invention as claimed below and would readily follow from the foregoing discussion.

It will now be apparent that several important advantages are provided by the present invention, as embodied above and claimed below. For example, the present invention enables a RAID to obtain significantly increased minimum data transfer rates, by as much as 50% or more, through the adjustment of data distribution ratios in relation to track radius. Further, depending upon the individual data I/O characteristics of the individual drives in a RAID and the required overall data transfer rate of the RAID, the present invention can increase the data storage capacity of the RAID to allow fuller (if not complete) utilization of the available disc storage area. Such increases in data capacity can also reduce the need for additional drives in the RAID, which can be important in some instances not only from a system cost standpoint, but also because array controllers can usually only accommodate up to a specified number of drives in the array. Data compression can also be reduced or eliminated, providing improved system quality (such as improved video readback quality in an AV application).

In view of the foregoing discussion, it will now be clear that the present invention is directed to a method and apparatus for improving minimum data transfer rate performance in a multi-drive array.

As exemplified in a preferred embodiment, the array comprises at least first and second disc drives 202, 204 each comprising a rotatable disc 214, 216 on which a plurality of tracks are defined (including 220, 222 and 230, 232, 270 respectively). LBAs 164 are defined on each of the tracks.

The tracks are further grouped into a number of zones 224, 226, 228 and 234, 236, 238 each having the same number of LBAs and each pair of zones from the discs of the first and second disc drives having corresponding LBAs. Data are transferred between the first and second disc drives in relation to the zone corresponding to the selected LBAs accessed during the transfer operation (steps 252, 254, 256, 258, 260, 262 of FIG. 9). Hence, a greater percentage of the data are written to and read from tracks that are physically located nearer the OD of the discs as compared to tracks that are physically located nearer the ID of the discs.

For purposes of the appended claims, the term "striping" will be understood consistently with the foregoing discussion to describe the transfer of data across a plurality of disc drives in a multi-drive array. The phrase "logical block address" will be understood as used herein to describe a data block to which data can be written. The term "RAID" will be understood as a redundant array of inexpensive discs as discussed hereinabove, and the phrase "RAID 0" will be understood to describe that particular level of RAID architecture discussed hereinabove. Moreover, although method steps have been set forth in various claims in a particular order, it will be recognized that the scope of such claims is not necessarily limited to performance in such order.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A method for writing data to a plurality of disc drives arranged in a multi-drive array, the array comprising at least first and second disc drives each having a rotatable disc on which a plurality of concentric tracks are defined, the method comprising steps of:

(a) arranging the data into a sequence of blocks of determined size; and (b) striping the data so that a plurality of the blocks are written to a first selected track of the first disc drive for each corresponding block written to a second selected track of the second disc drive, wherein the second selected track has a diameter which is less than a diameter of the first selected track.

2. The method of claim 1, further comprising a subsequent step of:

(c) reading the data from the first and second disc drives.

3. The method of claim 1, wherein the multi-drive array is characterized as a RAID 0.

4. The method of claim 1, wherein the multi-drive array is characterized as a RAID 1.

5. The method of claim 1, wherein the multi-drive array is characterized as a RAID 3.

6. The method of claim 1, wherein the multi-drive array is characterized as a RAID 5.

7. The method of claim 1, wherein the multi-drive array is characterized as a RAID 7.

8. The method of claim 1, wherein the multi-drive array is characterized as a RAID 0+1.

9. In a data storage system comprising at least first and second disc drives configured in a multi-drive array to operate as a single logical disc drive and an array controller which transfers data between the array and a computer, the array controller dividing the data between the first and second disc drives so that a portion of the data is written to each drive, a method for improving minimum data transfer rate performance of the data storage system, comprising steps of:

(a) identifying a first zone on a surface of a rotatable disc of the first disc drive comprising a selected range of logical block addresses to which the data can be selectively written, the first zone disposed near an outer diameter of the disc;

(b) further identifying a second zone on a surface of a rotatable disc of the second disc drive comprising a corresponding range of logical block addresses to which the data can be selectively written, the second zone disposed near an inner diameter of the disc; and (c) writing a block of data of determined size to the array where the block of data is divided between the first and second disc drives at a selected ratio so that a greater percentage of the block of data is written to the first zone as compared to the second zone.

10. The method of claim 9, wherein the performing step (c) further comprises:

(c1) writing the block of data using two logical block addresses from the first zone for each logical block address used from the second zone.

11. A multi-drive array, comprising:

first and second disc drives each comprising a rotatable disc on which a plurality of tracks are defined; and an array controller, operably coupled to the first and second disc drives, which stripes data across the first and second disc drives so that a plurality of fixed-sized blocks of the data are written to a first track of the first disc drive for each fixed-sized blocks of the data written to a second track of the second disc drive, wherein the first track has a radius greater than a radius of the second track.

12. The multi-drive array of claim 11, wherein the array controller is characterized as a RAID 0 controller.

13. The multi-drive array of claim 11, wherein the array controller is characterized as a RAID 1 controller.

14. The multi-drive array of claim 11, wherein the array controller is characterized as a RAID 3 controller.

15. The multi-drive array of claim 11, wherein the array controller is characterized as a RAID 5 controller.

16. The multi-drive array of claim 11, wherein the array controller is characterized as a RAID 7 controller.

17. The multi-drive array of claim 11, wherein the array controller is characterized as a RAID 0+1 controller.

* * * * *

UNITED STATES PATENT AND TRADEMARK OFFICE
CERTIFICATE OF CORRECTION

PATENT NO. : 6,115,788
DATED : September 5, 2000
INVENTOR(S) : Merle Eugene Thowe Page 1 of 1

It is certified that error appears in the above-identified patent and that said Letters Patent is hereby corrected as shown below:

Column 4,
Line 41, replace "inventions" with -- invention --.

Column 8,
Line 9, replace ".222" with -- 222 --.
Line 21, replace "farther" with -- further --.

Signed and Sealed this

Thirtieth Day of April, 2002

*Attest:*

JAMES E. ROGAN
*Attesting Officer*    *Director of the United States Patent and Trademark Office*